Aug. 8, 1933.  C. G. O'HARA  1,921,771
CONVEYER DEVICE
Original Filed June 20, 1932
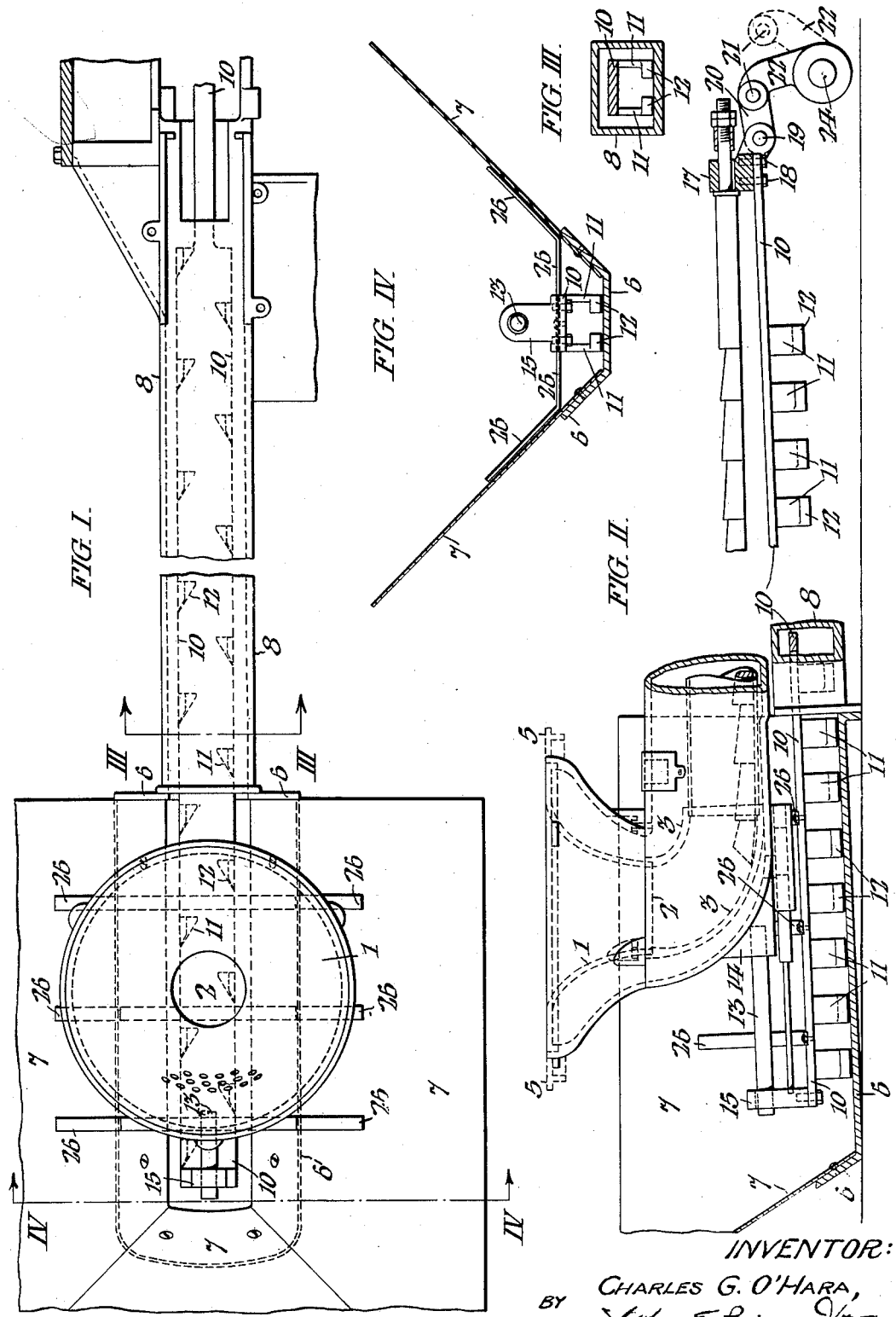
INVENTOR:
CHARLES G. O'HARA,
BY Arthur E. Paige, Attorney Patented Aug. 8, 1933                                                                                  1,921,771

UNITED STATES PATENT OFFICE 1,921,771

CONVEYER DEVICE

Charles G. O'Hara, Norristown, Pa.

Original application June 20, 1932, Serial No. 618,148. Divided and this application February 8, 1933. Serial No. 655,711

6 Claims. (Cl. 198—226)

This application is a division of my original application Serial No. 618,148 filed June 20, 1932 for Letters Patent of the United States for Improvement in automatic stokers, and the claims herein are limited to the conveyer device shown in that application for progressing material with respect to a grate in the stoker and including a conduit and a reciprocatory conveyer bar in said conduit having means for dislodging the material from the sides of the conduit toward the center of the latter when the bar is moved in one direction and for progressing the material longitudinally when the bar is moved in the opposite direction.

My invention includes the various novel features of construction and arrangement hereinafter more definitely specified.

In the drawing, Fig. I is a plan view of a portion of the automatic stoker which is the subject matter of my original application aforesaid, including a grate, an ash conveyer conduit in co-operative relation with said grate, and a conveyer bar mounted to reciprocate in said conduit.

Fig. II is a fragmentary side elevation of said stoker, shown in Fig. I; parts thereof being in section.

Fig. III is a transverse sectional view of said conduit and conveyer bar, taken on the line III, III in Fig. I.

Fig. IV is a transverse sectional view of the structure shown in Fig. I, taken on the line IV, IV, showing an end elevation of said bar and its appurtenances.

In said figures, 1 is a bowl shaped grate to which fuel is supplied through the axial opening 2 at the bottom thereof by way of the conduit 3. The details of construction of said grate and fuel conduit and means for feeding fuel are included in the subject matter of my original application aforesaid.

The ashes residue of the fuel consumed in said grate 1, being thrust upwardly by the feeding movement of the fuel, gravitate over the edge of the annular ring 5 which is supported in connection with said grate.

The pan 6 extends beneath said grate 1 and said ring 5 and is provided with outwardly flared sheet metal extensions 7 upon which the ashes fall from said ring and gravitate into said pan. Said pan has the ash conveyer conduit 8 rigidly connected therewith and extending to the place where it is desired to discharge the ashes.

The conveyer bar 10 has pendent members 11 at opposite sides thereof, in staggered relation with respect to the length of said bar, and having their lower ends 12 wedge shaped in the direction of length of said bar and close to the opposite sides of said conduit 8.

Said bar is mounted to reciprocate in said pan 6 and said conduit 8 and conveniently supported at its end in said pan by the stud 13 which extends from the bearing 14 in rigid relation with said grate 1 and ring 5 and upon which the bearing 15 carried by said bar 10 is fitted to slide. The opposite end of said bar 10 has the bracket 17 detachably fixed thereon, conveniently by the bolts 18 with the pivot 19 for connection with the link 20, the opposite end of which is connected with the pivot 21 on the rocker frame 22 which may be oscillated on the shaft 24 from the position shown in full lines to the position shown in dotted lines in Fig. II, by any convenient means.

The arrangement above described is such that said bar 10 and its pendent members 11 are suspended in close relation with said conduit but without scraping contact therewith.

As shown in Fig. I, the tapered ends of said wedges 12 are presented toward the grate and the butt ends thereof away from the grate. The effect of that arrangement is that movement of said bar 10 toward the grate wedges the ashes from the sides toward the center of said conduit 8 without progressing the ashes longitudinally with respect to said conduit, whereas, movement of said bar in the opposite direction progresses said ashes away from said grate in said conduit 8 by the butt ends of said wedges.

I also find it convenient to provide said bar 10 with upwardly extending scraper strips 26 which extend in close relation with said outwardly flared extensions 7 of the pan 6 to dislodge and precipitate into said pan any material which may have a tendency to adhere to the sides of said extensions.

However, it is to be understood that my conveyer device above described may be utilized in conveying any type of comminuted material. Therefore, I do not desire to limit myself to the precise details of construction and arrangement herein set forth, as it is obvious that various modifications may be made therein without departing from the essential features of my invention, as defined in the appended claims.

I claim:

1. In an automatic stoker, the combination with a grate; of means for progressing material with respect to said grate, including a conduit and a reciprocatory conveyer bar in said conduit; said bar having pendent members at opposite sides thereof, having their lower ends wedge shaped in the direction of the length of said bar; whereby, movement of said bar in one direction wedges said material from the sides toward the center of said conduit, without progressing it longitudinally with respect to said conduit, and movement of said bar in the opposite direction progresses said material in said conduit by the butt ends of said wedges.

2. Apparatus as in claim 1, wherein the wedges are pendent from the opposite sides of said bar in staggered relation with respect to the length thereof.

3. In a conveyer for comminuted material; the combination with a conduit; of a conveyer bar mounted to reciprocate in said conduit; said bar having pendent members, with their lower ends wedge shaped in the direction of the length of said conduit and close to the opposite sides of said conduit; whereby movement of said bar in one direction wedges any such material from the sides toward the center of said conduit, and movement of said bar in the opposite direction progresses such material in said conduit.

4. A conveyer as in claim 3; wherein the wedges are pendent from the opposite sides of said bar in staggered relation with respect to the length thereof.

5. In a conveyer for comminuted material; the combination with a pan having upwardly and outwardly flaring extensions for reception of said material; of a conduit extending from said pan; a conveyer bar mounted to reciprocate in said conduit; said bar having pendent members with their lower ends wedge shaped in the direction of the length of said conduit and close to the opposite sides of said conduit; and scraper elements on said bar close to the opposite sides of said pan; whereby movement of said bar in one direction dislodges such material from the sides toward the center of said pan and conduit, and movement of said bar in the opposite direction progresses such material in said conduit.

6. A conveyer as in claim 5; wherein the wedges are pendent from the opposite sides of said bar in staggered relation with respect to the length thereof.

CHARLES G. O'HARA.